United States Patent [19]

Jenkner

[11] Patent Number: 4,929,147

[45] Date of Patent: May 29, 1990

[54] PROCESS FOR CONVEYING A TRANSPORT PLATFORM TO A LIFTING TABLE OF A STACKING STATION

[76] Inventor: Erwin Jenkner, Lindenstr. 13, D-7261 Bechingen-Bergwald, Fed. Rep. of Germany

[21] Appl. No.: 194,679

[22] Filed: May 13, 1988

[30] Foreign Application Priority Data

May 14, 1987 [DE] Fed. Rep. of Germany ....... 3716203

[51] Int. Cl.$^5$ .............................................. B65G 57/24
[52] U.S. Cl. .................................... 414/786; 198/406; 198/836; 414/927
[58] Field of Search .................... 198/406, 409, 836; 414/927, 928, 786

[56] References Cited

U.S. PATENT DOCUMENTS

| | | | |
|---|---|---|---|
| 1,590,639 | 6/1926 | Marsh, Jr. | 198/836 X |
| 1,877,334 | 9/1932 | Lathrop et al. | 198/836 |
| 4,565,129 | 1/1986 | Simeth et al. | 414/927 X |
| 4,613,032 | 9/1986 | Berger et al. | 414/927 X |
| 4,696,614 | 9/1987 | Moen | 414/789.2 X |

FOREIGN PATENT DOCUMENTS

| | | |
|---|---|---|
| 2033828 | 1/1972 | Fed. Rep. of Germany . |
| 2312048 | 9/1974 | Fed. Rep. of Germany . |
| 2603887 | 8/1977 | Fed. Rep. of Germany . |
| 2084100 | 4/1982 | United Kingdom ................ 198/836 |

Primary Examiner—Robert J. Spar
Assistant Examiner—Janice Krizek
Attorney, Agent, or Firm—Herbert Dubno

[57] ABSTRACT

The process of conveying a transport platform to a lifting table of a stacking station where panels are stacked on the transport platform after the transport platform has been positioned horizontally on the lifting table. For a simple quick transfer an empty transport platform is positioned adjacent the lifting table in a normal position vertical or inclined to vertical and is put on the lifting table located in the receiving position by tipping into one horizontal position. A displacing device can be provided for moving the transport platform in the one horizontal position to another horizontal position in which the panels are received.

11 Claims, 6 Drawing Sheets

PROCESS FOR CONVEYING A TRANSPORT PLATFORM TO A LIFTING TABLE OF A STACKING STATION

FIELD OF THE INVENTION

My present invention relates to a process and apparatus for transferring a transport platform which is advantageously used to carry a stack of panels, plates or the like to a lifting table of a stacking station. More particularly, the invention relates to the conveying of transport platforms which have an approximately rectangular outline, e.g. a pallet or a panel plate or board, whose length and width are larger than its thickness, a lifting table of a stacking station at which a plurality of panels are stacked on the transport platform oriented substantially horizontally on the lifting table and in a lowered receiving position of the lifting table.

BACKGROUND OF THE INVENTION

Empty pallets or transport platforms are brought to the lifting table of a stacking station and objects to be stacked on the lifting table can be stacked while the lifting table is lowered as is described in German Printed Patent Application DE-AS 20 33 828. It is also known to make large-size panels in a so-called panel dividing unit or sawing unit using apparatus as manufactured, for example, by Firma Holzma Maschinenbau GMBH, D-7260 Calw-Holzbronn, Federal Republic of Germany. These units have a longitudinal and a transverse saw for cutting the large size panels into smaller rectangular pieces of different size.

The large size panels are cut up individually or to supply the so-called panel packets or groups of panels.

By "rectangular" I mean both square and nonsquare rectangular objects. The panels or pieces form similarly rectangular individual panels or panel packets. They must be transferred to the stacking stations after sorting according to size where they are arranged according to size.

Thus a single column of equal size pieces or several columns of equal size or different size pieces can be stacked on the lifting table of such a stacking station which is vertically movable up and down. In the latter case one can speak of a stack of several fixed sizes which also has several columns or individual stacks.

Thus it is known to form a stack on a transport platform on a lifting table. This transport platform can be advantageously a pallet or a so-called panel blank or finishing plate, which could previously have been mounted on the lifting table, e.g. by hand. Then after the stacking together with the stack carried by the transport platform it can be taken from the lifting table. The stack can then remain on the transport platform, for subsequent transport until it is taken from it again.

A pallet or other transport platform generally has an approximately rectangular outline and of course both a square or nonsquare rectangular periphery and its length and breadth measured in its horizontal position is substantially larger than its vertical thickness or height. The problem of transferring a transport platform to a lifting table in a simple and economically efficient way which allows a partial or complete automating has up to now not been solved satisfactorily, especially for the case in which several stacking stations are positioned side by side in a row with small spacing or without spacing.

OBJECTS OF THE INVENTION

It is an object of my invention to provide an improved process and apparatus for conveying a transport platform to a lifting table of a stacking station which avoids problems encountered in prior art techniques.

It is also an object of my invention to provide a process and apparatus for conveying a transport platform to a lifting table of a stacking station which is partially or completely automatic.

It is another object of my invention to provide a process and apparatus for conveying a transport platform to a lifting table of a stacking station which is partially or completely automatic and permits a rapid conveying of an empty transport platform in an efficient economical manner.

It is an additional object of my invention to provide a process and apparatus for conveying a transport platform to a lifting table at a stacking station which is partially or completely automatic but permits a rapid conveying of an empty transport platform in a simple economical manner, especially when a plurality of transport platforms must be transferred to several stacking stations positioned beside each other in a row in which these stacking stations are spaced from each other with only small spacing or without spacing.

SUMMARY OF THE INVENTION

These objects and others which will become more readily apparent hereinafter are attained in accordance with my invention in a process for conveying at least one transport platform having an approximately rectangular outline, which can be a pallet or plate, whose length and width is larger than its thickness, to at least one lifting table of at least one stacking station on which a plurality of panels are stacked on the transport platform oriented substantially horizontally on the lifting table, advantageously while lowered.

According to my invention an empty transport platform located in a normal position adjacent the lifting table either vertical or inclined to vertical is put on the lifting table located in a receiving position by tipping into one horizontal position.

These objects are also attained in an apparatus for conveying at least one transport platform to at least one lifting table of at least one stacking station for stacking a plurality of panels fed to the stacking station.

According to my invention this apparatus has a retaining device adjacent the stacking station for holding the transport platform in a normal position either vertical or inclined to vertical and further means are provided for bringing the transport platform held by the retaining device in the normal position into one horizontal position on the lifting table of the stacking station located in a predetermined receiving position by tipping.

The process according to my invention and the apparatus used to perform it allow a rapid transfer of transport platforms to one or more stacking stations. It is also applicable when several stacking stations are positioned in a row, but only when these stacking stations are positioned one beside another with only small spacing or without any spacing. Also the apparatus for performing the process according to my invention can be connected subsequently without problems to the already existing panel dividing machine and/or alternating variegated sawing unit with associated sorting devices.

If an apparatus not according to my invention is used it may not be connectable to the sawing unit or dividing machine easily. Then the existing units would have to be completely rebuilt. By contrast, only easily performed changes are required when the space for the feed devices for feeding the empty transport platforms is already present normally.

Also apparatus which performs the process according to my invention needs only comparatively little floor space since the transport platforms are conveyed on edge to the lifting table so that only a conveyor of comparatively small width is needed. Thus the feeding of the transport platforms to the stacking stations can occur advantageously under a panel feed table positioned locally fixed adjacent the lifting table and advantageously from the same side of the stacking station from which the panels to be stacked are transferred to the stacking station.

This process is particularly suited to stacking stations which are originally associated or subsequently associated with the alternating variegated sawing unit with associated sorting devices, in which a panel dividing machine or a sawing unit has a longitudinal saw and a transverse saw which cuts or saws large size panels or panel packets into pieces of different size.

Then these pieces sorted according to size are stacked on the transport platform mounted on the lifting table. These stacks of panels can be used to make pieces of furniture. Other applications are possible.

This process according to my invention is particularly well suited for stacking stations in which stationary feed tables, which one can designate as panel feed tables, are positioned adjacent the lifting table at a height equivalent approximately to its uppermost height.

These panel feed tables can be air cushion tables on which the pieces to be stacked, i.e. the panels or panel packets to be stacked, are transferred automatically or by hand and from which these built up stacks can be transferred to transport platforms positioned on the lifting tables.

One can then bring the empty transport platforms under the feed table into a normal position aligned with the vertical or inclined to the vertical to the lifting table involved and then, when the lifting table is located in its lowest position, the transport platform is brought to the lifting table from which the stack previously formed there together with the transport platform supporting it had been conveyed and then the new empty transport platform is put on it.

This has a number of advantages.

To build a stack the lifting table is lowered stepwise from an upper or its uppermost position according to the growth of the stack so that the the uppermost side of the uppermost stacked panel is located at the height of the feed table for transfer of the next panel or the next panel packet.

When the lifting table arrives in a predetermined lower, advantageously its lowest, position, the formation of the stack is ended and it is conveyed away together with the transport platform supporting it from the lifting table, e.g. to an additional driven roller conveyor or directly by a forklift stacker or truck or the like from the lifting table.

One then can, without changing the position of the lifting table, bring a new empty transport conveying platform in its normal vertical position or inclined to vertical to this lifting table automatically so that no unnecessary time is lost because no height adjustment of the lifting table is required.

The transport or conveying platform is positioned ahead of the lifting table in a vertical (erect) position or a position inclined to the vertical. From this position it is transferred to the lifting table by tilting of the transport or conveying platform into a horizontal orientation, e.g. under its own weight.

Also the invention permits a single feed conveyor to be associated with a plurality of stacking stations positioned side by side in a row. Then transport platforms at a position already vertical or inclined to the vertical on this feed conveyor can be put in a position advantageously in the vertical or inclined to the vertical in which they are located also in their normal position adjacent the lifting table so that these feed conveyors of the transport platforms require only a little space.

The feed conveyor can be of such a length that it supports the transport platform with its small side and also in its normal position adjacent the lifting table and one or more additional conveyors can be aligned with the feed conveyor which supports the transport platform in its normal position adjacent the lifting tables.

The conveyor or the conveyors which act for feeding the transport platform to the stacking stations can be roller conveyors. However also other conveyors, e.g. driven conveyors with endless conveyor belts or the like, can be used.

The automatic conveying of the transport platforms in the normal position adjacent the lifting tables of the stacking stations is effected advantageously by moving the transport platforms in the normal position vertical or inclined to the vertical. They can then be held by one or more supporting members of a supporting means, advantageously lateral guides, in their normal position vertical or inclined to the vertical.

The transport platforms can contact these supporting members or lateral guides. These lateral guides can advantageously be sliding guides, e.g. one or more rods, rails or the like. However they can also be movable guiding members, e.g. pivotally mounted rollers positionable in a fixed position or endless belts guided about guide rollers or the like. These belts or rollers or the like need not be driven since they serve only for lateral support of the transport platform.

Advantageously the transport platforms can be inclined at an angle of 0° to 30° to the vertical adjacent the lifting table involved on which they are deposited by tipping. Advantageously they are put at such an angle that they are located in a position in which they can tip by themselves to the lifting table by falling as soon as the supporting means holding them in this position is moved away from it. It is required then to support only one end of the transport platform in its normal position and if necessary also on the conveyor or conveyors acting on this normal position of the platform.

It is however also possible to change its position during the automatic feeding of its conveyor in the normal position adjacent the lifting table, e.g. to change its inclination to the vertical during its transport to one or more of the driven conveyors. Shortly before its arrival at the stacking station involved it can be inclined to the vertical during transport to the stacking stations just so far that it falls on the lifting table in a free fall after the supporting means retaining the transport platform in position are moved away. Tipping of the Transport platform from its normal position, while the platform is continuously supported, can be effected until it arrives almost entirely or completely on the lifting table.

Advantageously the transport platform, when it is transferred from its normal position adjacent the lifting table to one initial horizontal position by tipping, is automatically pushed by an automatic displacing device or positioning means from this initial horizontal position into another horizontal position in which it receives the panels or stacks of panels. The displacing device can have one or more linearly adjustable push rods or struts which are movable advantageously by a piston-and-cylinder unit. However it can be also moved in another way, e.g. by a toothed bar drive, a rack or the like. Also other possibilities exist for alignment of the transport or conveying platforms on the lifting table by one or more pivotally supported driven levers.

The invention is also applicable to a stacking station whose lifting tables are movable horizontally to transfer stacks formed on it to the transport of the roller conveyor or the like guiding the stack. These lifting tables are then returned again to their normal position where the stacking can proceed on them.

This is possible when one or more stacking stations are arranged side-by-side in a row so that the transfer of the stack formed on one stacking station is completely independent of the other stacking station. Then immediately after return of the lifting table to its normal position an empty transport or conveying platform can be mounted on it and then again a new stack can be begun.

The process according to my invention particularly allows a rapid exchange of a transport or conveying platform carrying a stack on a lifting table of a stacking station with a new empty transport platform.

BRIEF DESCRIPTION OF THE DRAWINGS

The above and other objects, features and advantages of my invention will become more readily apparent from the following description, reference being made to the accompanying highly diagrammatic drawings in which.

SPECIFIC DESCRIPTION

Figures 5, 8:
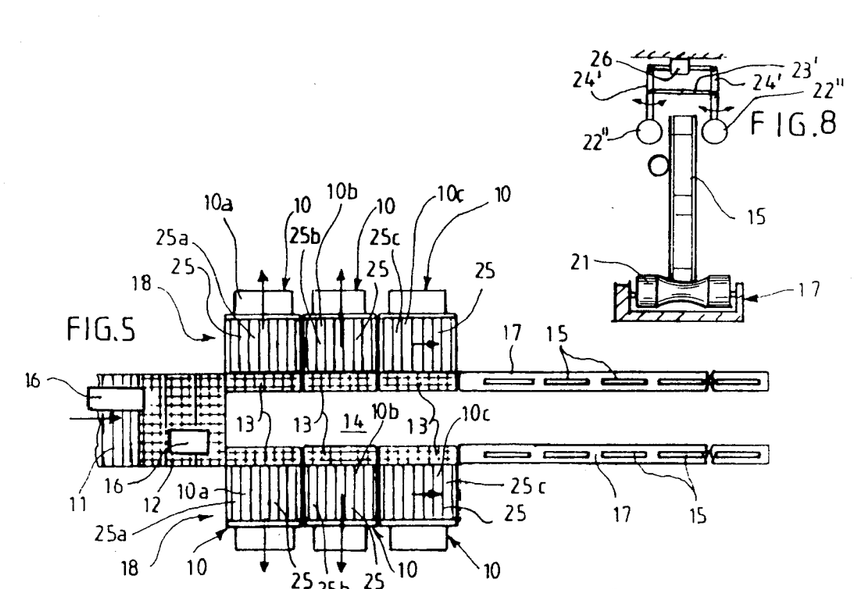
FIG. 5 is a top view of two rows of stacking stations arranged parallel to each other which act for stacking of rectangular panels of different size sawed on an alternating variegated sawing unit in which the individual stacking stations can be formed according to the apparatus shown in FIGS. 1 to 4.
FIG. 8 is an enlarged cross sectional view through the apparatus shown in FIG. 6 taken along the section line 8—8 in FIG. 6.

In the plant according to FIG. 5 rectangular panels or groups of panels 16 subdivided in an alternating variegated sawing device from large size panels are fed to stacking stations 10 arranged in two rows 18 sorted according to size where they are stacked.

The columns of panels and/or stacks of panels of the same size are arranged with equal edges over each other. Here two rows 18 are shown with three stacking stations 10 immediately adjacent each other however the number of rows and stacking stations can be less or greater.

A powered roller conveyor 11 which connects to a multicomponent wide air cushion table 12 (which in turn is connected to the smaller feed tables 13 which can be air cushion tables also) leads to these stacking stations 10. The smaller feed tables 13 are positioned approximately at the height of the highest positions of the lifting tables 25 at the stacking stations 10.

A service passage 14 is located between the rows of the smaller feed 13 which accommodates a worker or workers who convert the panels or groups of panels 16 fed from the roller conveyor 11 and the air cushion table 12 to the stacking stations 10 by the smaller feed tables 13 to the lifting tables 25 into the stacks sorted according to size on the lifting tables 25.

If a complete panel stack which can comprise one or more columns of panels is formed on a lifting table 25 and if a stack of a fixed size or a stack of more than one predetermined size is made, then this stack is carried away by the lifting table 25. This is effected when this lifting table 25 is in a lowered position, advantageously in its lowest position in which each of the stacks is positioned on a conveying platform 15 which generally is a pallet or a blank panel as is commercially available as a support or to protect the lowest member of the stack. The use of such panels for a sawing unit is known.

It should be clear that initially an empty conveying platform 15 is placed upon an empty lifting table 25, that then the conveying platform is stacked with plates, boards or panels 16, and that, only after stacking has been completed, is the conveying platform 15 with its stack displaced from the respective lifting table 25 so that the latter is again empty to receive another empty conveying platform 15 on which another stack of plates, boards or panels 16 can be built.

The conveying of the stack from the lifting table 25 is effected in a known way. For example these lifting tables 25 can have driven roller conveyors which can feed the stack formed on them to one or more additional driven roller conveyors or to a conveying carriage. Alternatively it can be conveyed in some other way.

In this embodiment the lifting tables 25a and 25b can be extended horizontally from the stack station rows 18 for delivery of the stack and then the stack can be taken away by unshown roller conveyors or the like and it can be fed from the lifting table 25c directly in the direction of the arrow to the unshown additional roller conveyor.

After conveying of the conveyor platform 15 with its stack of plates, boards or panels 16 thereon from a lifting table 25, the lifting table returns into its upper position stations 10a and/or 10b and can be provided again with an empty conveying platform 15. Since the lifting table 25c can not travel horizontally, it can immediately be provided again with an empty conveying platform 15 after each stack delivery.

The unit shown in FIG. 5 has a driven or powered roller conveyor 17 for this purpose for each row of stacking stations 18. The roller conveyor 17 ends directly in front of the rear most stacking station 10c of this row 18. The rollers 21 of the roller conveyor 17 are driven and can have the rotationally symmetrical form seen in FIGS. 1 or 7.

Adjacent each of the three stacking stations 10a to 10c which form one of the rows 18 a driven individual roller conveyor 19 is positioned below each feed table 13 and spaced from it.

Each individual roller conveyor 19 can operate with the same principle as the driven feed roller conveyor 17. In fact the driven rollers 21 can be exactly the same as those used in the feed roller conveyor 17. Each conveyor 17 and 19 is engageable and disengageable according to choice for feeding the transport platforms 15.

Figure 6:
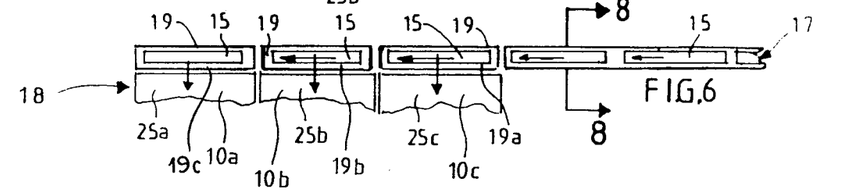
FIG. 6 is a magnified top view of a row of stacking stations in front of the lifting table of the individual conveyor belts associated with an apparatus according to FIG. 5.

In FIG. 6 the individual roller conveyors 19 indicated with the reference characters 19a, 19b, 19c for the transport platforms 15 are illustrated schematically as associated with one row 18 of stacking stations 10a to 10 c.

In the embodiment according to FIGS. 1 to 4 the transport platforms 15 are conveyed in an approximately vertical orientation both on the feed roller conveyor 17 and also on the individual roller conveyors 19 where they sit with their lower small ends approximately vertical on the deep middle portion of the driven rotationally symmetrical rollers 21 and are kept from tipping over by the supporting members (22, 22a, 22' and 22") in the provided position. These supporting members comprise the lateral guides 22, 22', 22" extending horizontally and parallel to the feed direction of the transport platforms 15 which prevent them from tipping and extend adjacent the upper ends of the transport platforms 15. The spacing of these lateral guides 22, 22' and/or 22", 22" from each other can be adjusted to fit different thicknesses of the transport platforms 15 (FIGS. 1 to 3) and the plates 15 (FIG. 4) which is effected in the embodiment according to FIGS. 1 to 4 and 8 since these lateral guides 22, 22' and/or 22", 22" are mounted on levers 24 and/or 24' held rotatably on a transverse rod 23 and/or 23'.

The levers can be adjusted by an adjusting motor 26 and act on the upper ends of the platforms 15 facing the guide rods.

The lateral guides 22, 22' positioned above each individual roller conveyor 19 which extends approximately over the length of the associated individual roller conveyor 19 can be moved for tipping and release of the transport platform 15 by a piston-cylinder-unit 40 whose lower end is rotatable on a stationary support 42 and whose piston rod 41 is joined pivotally to the transverse rod 23 which is pivotally mounted on a stationary support 43 as is illustrated.

Figure 1:
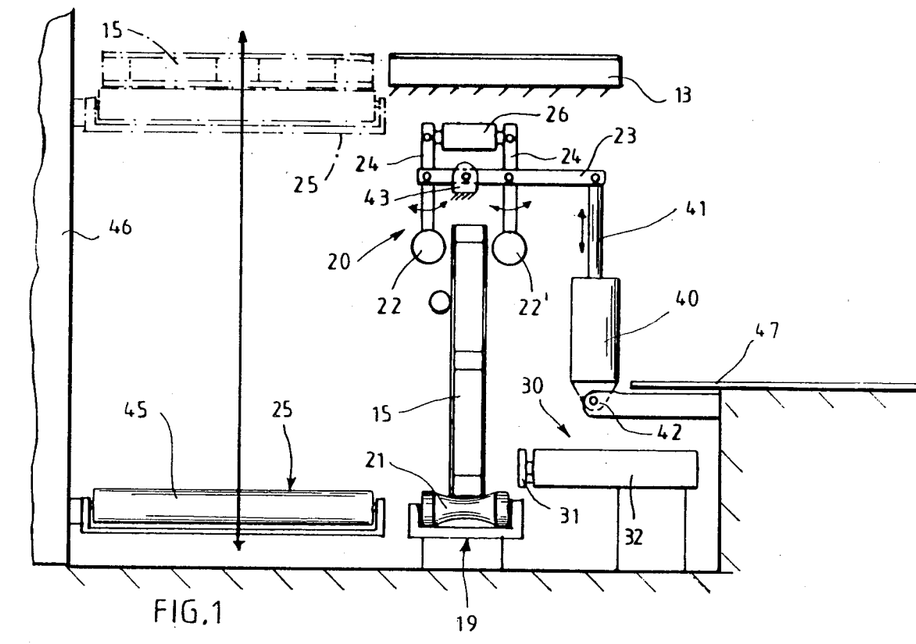
FIG. 1 is a side elevational view of a stacking station with one embodiment of the apparatus according to my invention for conveying empty pallets or plates to it.
Figure 2:
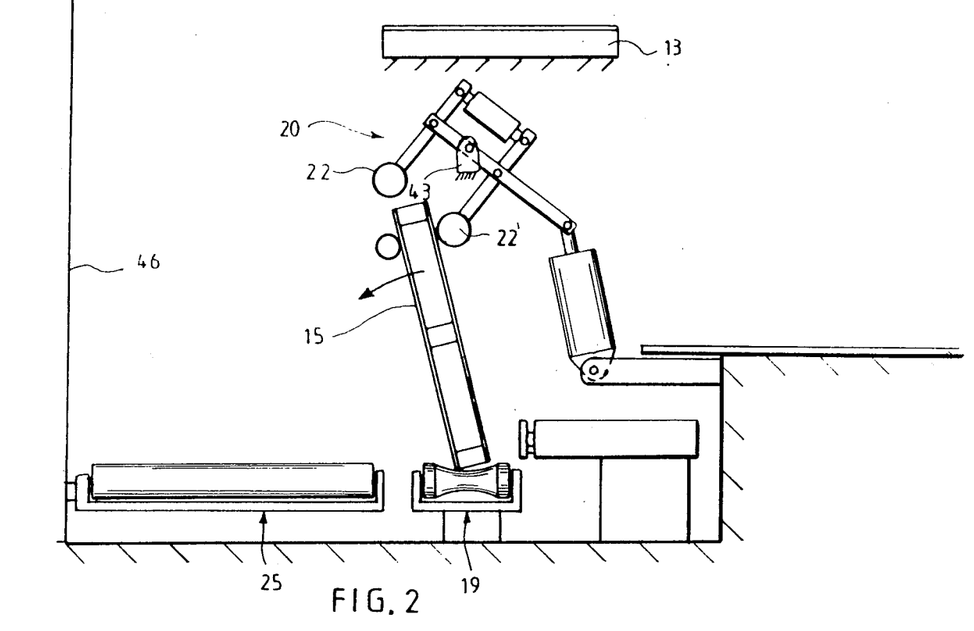
FIG. 2 is a partial side elevational view of the apparatus shown in FIG. 1 in which a pallet begins to tip directly to the lifting table of the stacking station.
Figure 3:
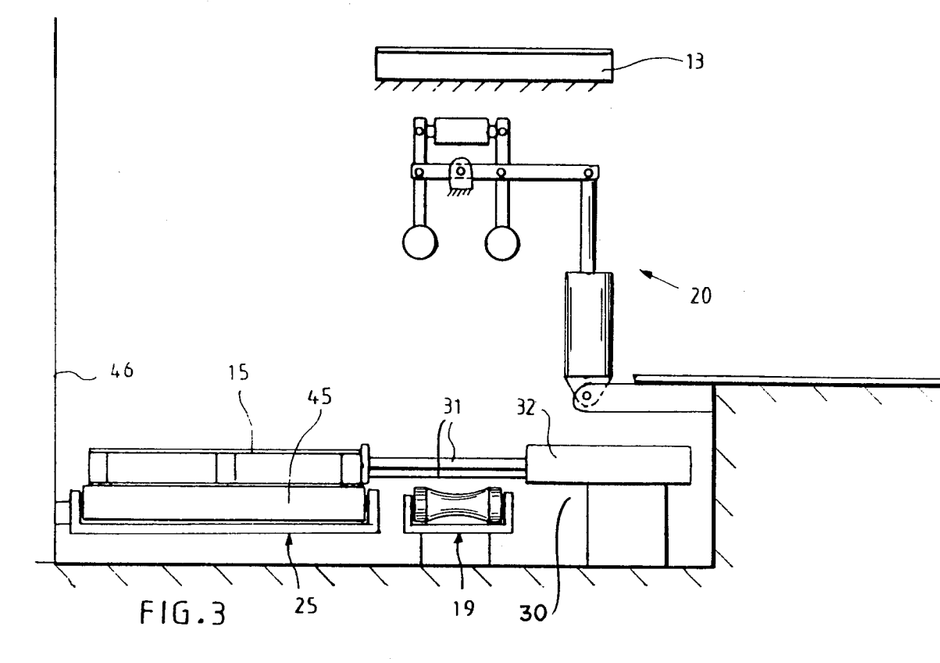
FIG. 3 is a partial side elevational view of the apparatus shown in FIG. 1 in a configuration in which the platform mentioned above falling on the lifting table is pushed into a predetermined final horizontal position on the lifting table.
Figure 4:
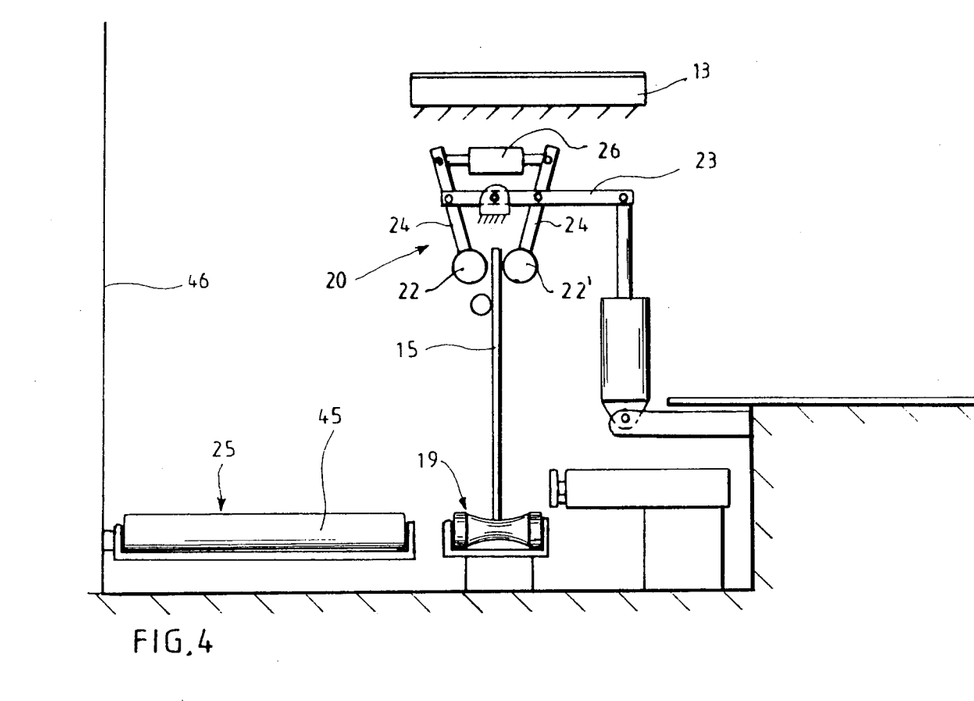
FIG. 4 is a partial side elevational view of the apparatus shown in FIG. 1 which is changed to convey a thin plate instead of a thick pallet.

Thus the lateral guides 22, 22' can be swung from the base configuration shown in FIGS. 1, 3 and 4 into the pivoted configuration shown in FIG. 2 by pulling or drawing in the piston rod 41. The transport platform 15 held between both lateral guides 22, 22' is then swung or pivoted by the one lateral guide 22' and the other lateral guide 22 is swung away from the path of the transport platform 15 so that it now drops on the roller conveyor 45 of the lifting table 25 and locates itself then in one horizontal position on this roller conveyor 45.

At this point however it has not taken its final other horizontal position on this driven conveyor 45. It is pushed into its other horizontal position by two push rods 31 of a displacing device 30 which is associated with the front end of the piston rod of a pneumatic or hydraulic piston-and-cylinder unit 32.

In FIG. 3 these push rods 31 have pushed a platform 15 into its other final horizontal position on the roller conveyor 45 of the lifting table 25. Then the push rods 31 are retracted and the lifting table 25 travels up into the position indicated with dot-dashed lines in FIG. 1 where the stacking on the transport platform 15 is begun.

When the desired stack height is attained which is normally the case when the lifting table 25 raisable and lowerable vertically by a lifting device 46 carried on it is lowered into its lowest position, then the platform 15 is conveyed from the lifting table 25 with the stack carried by it.

Previously a new empty platform 15 or plate 15 was brought into the initial position shown in FIGS. 1 to 4 and it is tipped now by pivoting the lateral guides 22, 22' again on the roller conveyor 45 of the lifting table 25 and then is brought into the provided final other horizontal position on this lifting table 25 by the push rods 31 and then the process can begin again with the next stack of panels 16.

The feed of the transport platforms 15 to the individual roller conveyors 19 and thus into their final position on them from which they then tip toward the lifting tables 25 can be described as follows:

On the right end of each of the feed roller conveyors 17 loading stations are located where empty conveying platforms 15 can be mounted one after the other, e.g. by an operator or automatically.

After each mounting of a transport platform 15 on a feed roller conveyor 17 it is switched on long enough until the transport platforms 15 located on it are conveyed further for a distance equal to the length or somewhat more than the length of the transport platform 15 and a transport platform 15 is started on its way on the end of the feed roller conveyor 17 involved. It is assumed that no transport platform 15 is located on the individual roller conveyors 19 adjacent the stacking stations 10. One can then feed empty transport platforms 15 to each individual roller conveyor 19 by appropriately switching on and off the feed roller conveyors 17 and the individual feed roller conveyors 19. Thus each individual roller conveyor 19 feeds another individual roller conveyor 19 positioned in front or downstream of it in the feed direction of the transport platforms 15. It also feeds transport platforms 15 to the individual roller conveyors 19 following it. In this way transport platforms 15 can be positioned in their normal positions on all the individual roller conveyors 19 and then as described previously tipped to the lifting tables 25 and oriented on them. One can then immediately convey a new empty transport platform 15 to an empty individual roller conveyor 19 and leave it on it in its normal position until the associated lifting table 25 can be emptied and then the new empty transport platform is tipped on it. This empty transport platform is located thus in its normal other horizontal position at this stacking station 10. With control means comprising a suitable programmable controlling unit or computer the feed of the transport platforms to the individual conveyors, their halting in the provided normal position and their tipping to the lifting table and their alignment on it can be performed automatically.

When a lifting table 25 has emptied at a chosen stacking station 10 and an empty transport platform 15 tipped to it, the process of stacking on it can be started. Thus the state of the other stacking stations can be arbitrary, e.g. all the other stacking stations can be simultaneously stacked. When at an arbitrarily chosen stacking station, the associated individual roller conveyor has emptied, a new empty transport platform 15 in its normal position can be transferred immediately to it which automatically is effected by appropriate drive of the feed roller conveyor 17 and as the case may require its individual roller conveyor or conveyors and their drives which are associated with it.

Each empty individual roller conveyor 19 can be supplied by an individual roller conveyor 19 positioned in front of it and/or by the feed roller conveyors 17 positioned in front of it directly with a transport platform 15 so that a transport platform can be supplied to all the individual roller conveyors 19.

The normal position of a transport platform 15 on an individual roller conveyor 19 can be signaled or determined by its arrival at a raisable and lowerable contact S or by light barrier control or in other ways. The contact S can be a leaf spring which is pushed aside when the transport platform 15 falls to the lifting table 25.

When for example a transport platform 15 could be tipped on the lifting table 25 associated with it from the individual roller conveyor 19a of a row 18 which is furthest upstream in the transport direction of the transport platforms, then this most upstream individual conveyor roller 19a is supplied with a new transport platform 15 by the feed roller conveyor 17. When the middle individual roller conveyor 19b of a row 18 was emptied by tipping of a transport platform 15 found on it to the associated lifting table 25, then an empty transport platform 15 is transferred from the upstream individual roller conveyor 19a and this upstream individual roller conveyor 19a then is supplied by the feed roller conveyor 17 with a new transport platform 15, and so forth. All this can take place under automatic program control and/or state control.

It is also possible to bring the transport platform 15 extraordinarily quickly and simply to the lifting tables 25 of the stacking stations 10. Since the individual roller conveyors 19 and the retaining devices 20 associated with them for the transport platforms 15 mounted on them are located entirely or substantially below the feed tables 13 located at these stacking stations 10, the service passage 14 is not restricted by the supply of the transport platforms 15 between these feed tables 13.

In the embodiment according to FIG. 1 the piston-and-cylinder unit 32 extends below the feed table 13 and lies in a depression at the bottom of the machine room above a grate 47 located there which serves as a floor for access to this service passage 14. Most importantly no space in the service passage 14 is consumed for the feed of the transport platform 15.

All conveyors or roller conveyors 17 and 19 associated with a stacking station row form a linear row in which these roller conveyors connect to each other for delivery of the transport platforms 15. The transport of the transport platforms 15 always goes in the same direction.

Figure 7:
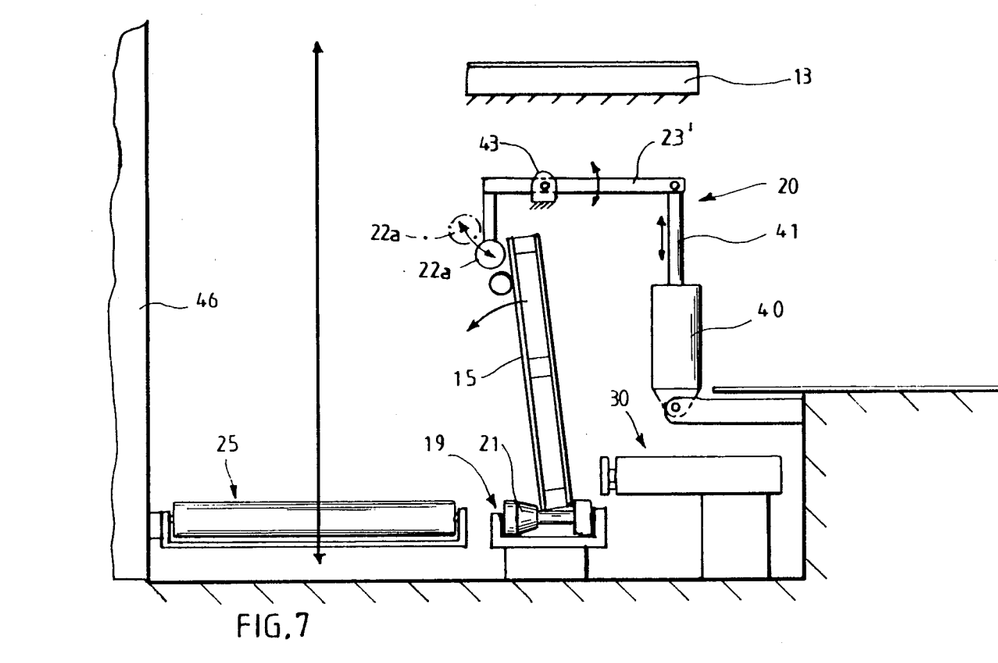
FIG. 7 is a side elevational view of another embodiment of the apparatus according to my invention for conveying empty pallets or blank panels to it.

The retaining device 20 according to FIG. 7 corresponds to that according to FIGS. 1 to 4 with a single difference, namely that the transport platforms 15 suitably inclined to the vertical on the roller conveyor or conveyor belt 17 and/or 19 by a single lateral guide 22a for each conveyor are maintained so that they, when they are located in their normal position adjacent a lifting table 25, already are inclined in a direction on the lifting tables 25 so that they after guiding away the horizontal lateral guide 22a associated with the individual roller conveyors 19 fall into the dot-dash position on the lifting tables 25 by their own weight.

In such an inclined position the transport platforms 15 can be held on the feed roller conveyor 17 so that this feed roller conveyor 17 then likewise only requires one lateral horizontal guide rod to prevent the dropping of the transport platform located on it.

In transport of the transport platform to the conveyor belt the transport platform leaning on the guide rod with its broad side slides on this guide rod. The lateral guide 22a associated with the feed roller conveyor 17 can be fixed in position. Each individual roller conveyor 19 is associated with its own single lateral guide 22a which can be moved from the position indicated with solid lines to the position indicated by dot-dashed lines by an adjusting motor 40 formed as a piston-cylinder-unit. When the lateral guide 22a is in the position indicated with the dot-dashed lines the transport platform 15 is released to fall on the lifting table 25. After tipping a transport platform 15 supported laterally by it onto the appropriate lifting table 25 then this lateral guide 22a is then returned into its completely extended normal position and the next transport platform 15 can be brought to this individual roller conveyor 19.

The rollers of the roller conveyors 17 and 19 are formed so that the rollers 21 are protected against lateral slipping by a gradation on each roller 21 with their small sides abutting on the transport platform. It is also conceivable to secure them from lateral slipping in another way, for example by additional guide rods or the like associated with the rollers 21. The device according to FIG. 7 requires no adjustment for transport platforms of different thicknesses.

The transport platforms 15, which are transferable to the lifting table 25 by the feed units, can as shown have different thicknesses. Also their width and length can have different limits. The size of the panels to be stacked on it can have any size less than a certain maximum size.

By "rear" stacking station or end of the apparatus I mean that end to which the transport platforms 15 are fed.

By definition the "supporting members" referred to previously and in the following are part of the "supporting means" referred to in the following.

By "retaining device" I mean the parts of the apparatus which hold the transport platform adjacent the lifting table in its normal position vertical or inclined to vertical.

By "stop device" in the following claims I mean the "supporting means" or the "lateral guides" for the transport platform.

I claim:

1. In a process for conveying at least one transport platform having an approximately rectangular outline, which can be a pallet or a plate, whose length and width is larger than its thickness, to at least one lifting table of at least one stacking station at which a plurality of panels are stacked on said transport platform oriented horizontally on said lifting table, the improvement wherein an empty one of said transport platforms located in a normal position inclined from vertical adjacent said lifting table is placed on said lifting table located in a receiving position by tipping it into a horizontal position, said empty transport platform being tipped by the force of gravity onto said lifting table and said transport platform in said normal position adjacent said lifting table of said stacking station is oriented at an angle to said vertical from which said transport platform can tip by the weight of said transport platform to said lifting table as soon as a stop device retaining said transport platform in said normal position is released.

2. The improvement as defined in claim 1 wherein said lifting table of said stacking station is raisable and lowerable and is as low as possible in said receiving position, in which position also said stack formed on said lifting table is delivered.

3. In a process for conveying at least one transport platform having an approximately rectangular outline, which can be a pallet or a plate, whose length and width is larger than its thickness, to at least one lifting table of at least one stacking station at which a plurality of panels are stacked on said transport platform oriented horizontally on said lifting table, the improvement wherein an empty one of said transport platforms located in a normal position adjacent said lifting table either vertical or inclined from vertical is placed on said lifting table located in a receiving position by tipping it into a horizontal position, said empty transport platform being transported to said stacking station by at least one conveyor comprising a roller conveyor on which said transport platform is in said normal position either vertical or inclined to vertical and is oriented so that in said normal position adjacent said lifting table a small side of said transport platform rests on said conveyor.

4. The improvement as defined in claim 3 wherein a plurality of said empty transport platforms are transported in succession simultaneously on one of said conveyors comprising one of said roller conveyors which leads to another one of said conveyors aligned with said one conveyor and located adjacent one of said stacking stations to which one of said transport platforms is transferred and said transport platform is further transferred by said other conveyor on which said transport platform can take said normal position to either said lifting table of one of said stacking stations or to a following downstream one of said conveyors which is associated with another one of said stacking stations.

5. In a process for conveying at least one transport platform having an approximately rectangular outline, which can be a pallet or a plate, whose length and width is larger than its thickness, to at least one lifting table of at least one stacking station at which a plurality of panels are stacked on said transport platform oriented horizontally on said lifting table, the improvement wherein an empty one of said transport platforms located in a normal position adjacent said lifting table either vertical or inclined from vertical is placed on said lifting table located in a receiving position by tipping it into a horizontal position, a plurality of said stacking stations being positioned in a row are fed said empty transport platforms along a linear conveying path comprised of at least one conveyor in a feed direction such that when space is available for a new one of said empty transport platforms adjacent one of said stacking stations, all of said transport platforms located on said conveyor or conveyors adjacent said stacking stations are further transported in said feed direction a distance approximately corresponding to the distance between the center lines of adjacent ones of said stacking stations, said stacking stations being supplied with one of said empty transport platforms.

6. In a process for conveying at least one transport platform having an approximately rectangular outline, which can be a pallet or a plate, whose length and width is larger than its thickness, to at least one lifting table of at least one stacking station at which a plurality of panels are stacked on said transport platform oriented horizontally on said lifting table, the improvement wherein an empty one of said transport platforms located in a normal position adjacent said lifting table either vertical or inclined from vertical is placed on said lifting table located in a receiving position by tipping it into a horizontal position, the conveying of said empty transport platform to said stacking stations on at least one locally fixed conveyor being effected in said normal position in which said transport platform sits with a small side on said conveyor and in which said transport platform can be secured against falling in said normal position by at least one supporting member comprising a lateral guide on which a side of said transport platform can come into contact.

7. In a process for conveying at least one transport platform having an approximately rectangular outline, which can be a pallet or a plate, whose length and width is larger than its thickness, to at least one lifting table of at least one stacking station at which a plurality of panels are stacked on said transport platform oriented horizontally on said lifting table, the improvement wherein an empty one of said transport platforms located in a normal position adjacent said lifting table either vertical or inclined from vertical is placed on said lifting table located in a receiving position by tipping it into a horizontal position, and wherein for tipping of said empty transport platform from said normal position on said lifting table of said stacking station at least one supporting means which secures said transport platform in said normal position from tipping is moved so that said transport platform can fall onto said lifting table when released, said empty transport platform contacting said supporting means in said normal position so that after guiding away said supporting means from said transport platform, said transport platform tips over by itself onto said lifting table by the force of gravity acting on said transport platform.

8. The improvement as defined in claim 7 wherein at least one of said supporting means securing said transport platform in said normal position is present on both sides of said transport platform, of which one of said supporting means moves said transport platform in the desired tipping direction and the other of which is moved from the gripping path of said transport platform.

9. In a process for conveying at least one transport platform having an approximately rectangular outline, which can be a pallet or a plate, whose length and width is larger than its thickness, to at least one lifting table of at least one stacking station at which a plurality of panels are stacked on said transport platform oriented horizontally on said lifting table, the improvement wherein an empty one of said transport platforms located in a normal position adjacent said lifting table either vertical or inclined from vertical is placed on said lifting table located in a receiving position by tipping it into a horizontal position, said transport platform during tipping from said normal position into said horizontal position on said lifting table being secured continuously by at least one supporting means against free fall until shortly before coming in contact with said lifting table at which point said transport platform is released from said supporting means and travels to said lifting table in a free fall.

10. The improvement as defined in claim 9 wherein said transport platform transferred by tipping onto said lifting table is moved automatically into said horizontal position substantially on said lifting table.

11. A process for conveying a plurality of transport platforms to a plurality of raisable or lowerable lifting tables of a row of stacking stations at which a plurality of panels are stacked on said transport platforms comprising:
   (a) conveying an empty one of said transport platforms to a conveyor adjacent one of said lifting tables located in a lowered receiving position at one of said stacking stations held oriented at an angle less than or equal to approximately 30° to vertical by at least one supporting means comprising a lateral guide;
   (b) moving said supporting means from said transport platform so said supporting means no longer holds said transport platform at said angle;
   (c) allowing said transport platform to fall from the same side from which said panels to be stacked are put on said lifting table to one horizontal position on said lifting table in said lowered receiving position by tipping under the force of gravity;
   (d) shifting said transport platform from said one horizontal position on said lifting table to another horizontal position in which said panels are stacked;
   (e) raising said lifting table with said transport platform to a height above said supporting means and said conveyor;
   (f) stacking said panels on said transport platform which gradually lowers to said lowered receiving position under the weight of said panels and simultaneously repeating step a;
   (g) transferring said panels and said transport platform from said lifting station in said lowered receiving position; and
   (h) repeating steps (b) to (d) to provide a new empty one of said transport platforms on said lifting table.

* * * * *